United States Patent
Soderqvist

(10) Patent No.: US 12,221,822 B2
(45) Date of Patent: Feb. 11, 2025

(54) DOOR OPERATION MANAGEMENT SYSTEM

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 448 days.

(21) Appl. No.: 17/616,835

(22) PCT Filed: Jun. 9, 2020

(86) PCT No.: PCT/EP2020/065895
§ 371 (c)(1),
(2) Date: Dec. 6, 2021

(87) PCT Pub. No.: WO2020/254141
PCT Pub. Date: Dec. 24, 2020

(65) Prior Publication Data
US 2022/0307317 A1    Sep. 29, 2022

(30) Foreign Application Priority Data
Jun. 17, 2019 (SE) .................................. 1930199-3

(51) Int. Cl.
*G05B 15/02* (2006.01)
*E05F 15/77* (2015.01)
*E05B 47/00* (2006.01)

(52) U.S. Cl.
CPC .............. *E05F 15/77* (2015.01); *G05B 15/02* (2013.01); *E05B 2047/0068* (2013.01);
(Continued)

(58) Field of Classification Search
CPC .......... E05F 15/77; E05F 15/70; G05B 15/02; E05B 2047/0068; E05B 2045/063;
(Continued)

(56) References Cited

U.S. PATENT DOCUMENTS

| 10,204,466 B1 | 2/2019 | Rothmuller |
| 2004/0140782 A1 | 7/2004 | Okabe et al. |

(Continued)

FOREIGN PATENT DOCUMENTS

| CN | 101246356 | 8/2008 |
| CN | 105612565 | 5/2016 |

(Continued)

OTHER PUBLICATIONS

International Search Report in PCT/EP2020/065895 mailed Aug. 25, 2020.

(Continued)

*Primary Examiner* — Yuhui R Pan
(74) *Attorney, Agent, or Firm* — Wissing Miller LLP

(57) ABSTRACT

A door operation management system (100), method and computer program product for controlling operation of a door (1), the door operation management system (100) comprises at least a first movement sensor device (10a, 10b, 10c) arranged at the door (1), for determining a movement of the door (1); and a processing circuitry (102a, 102b) operatively connected to the at least first movement sensor device (10a, 10b, 10c) configured to cause the door operation management system (100) to obtain at least a first sensor data (dd1, dd2, dd3, dd4) from the at least first movement sensor device (10a, 10b, 10c); and determine at least a first state (st1, st2, st3, st4) of the door (1) based on the at least a first sensor data (dd1, dd2, dd3, dd4).

12 Claims, 3 Drawing Sheets

(52) U.S. Cl.
CPC ..... *E05Y 2400/354* (2013.01); *E05Y 2400/36* (2013.01); *E05Y 2400/66* (2013.01); *E05Y 2900/132* (2013.01)

(58) Field of Classification Search
CPC ......... E05B 2045/067; E05Y 2400/354; E05Y 2400/36; E05Y 2400/66; E05Y 2900/132; E05Y 2400/10; E05Y 2400/44; E05Y 2400/32; G08B 13/08
See application file for complete search history.

(56) References Cited

U.S. PATENT DOCUMENTS

| | | |
|---|---|---|
| 2010/0115853 A1 | 5/2010 | Gebhart et al. |
| 2015/0027057 A1 | 1/2015 | Britt, Jr. et al. |
| 2017/0162012 A1* | 6/2017 | Kim .......................... E06B 7/28 |
| 2017/0260783 A1* | 9/2017 | Crolley ..................... E05D 3/02 |
| 2018/0082503 A1* | 3/2018 | Kvinge ............... G07C 9/00309 |
| 2019/0019381 A1 | 1/2019 | Soulhiard et al. |

FOREIGN PATENT DOCUMENTS

| | | |
|---|---|---|
| CN | 106968547 | 7/2017 |
| DE | 202014001263 | 2/2014 |
| EP | 1970516 | 9/2008 |
| EP | 2770486 | 8/2014 |
| JP | 2003162775 | 6/2003 |
| WO | 2013177443 | 11/2013 |
| WO | 2015051942 | 4/2015 |
| WO | 2017097771 | 6/2017 |

OTHER PUBLICATIONS

Swedish Search Report for 1930199-3 mailed Jan. 27, 2020.
Chinese Office Action in 2020800408211, dated Feb. 14, 2023.

\* cited by examiner st1 st2 st3 st4

DOOR OPERATION MANAGEMENT SYSTEM

This application is a 371 of PCT/EP2020/065895, filed on Jun. 9, 2020, published on Dec. 24, 2020 under publication number WO 2020/254141, which claims priority benefits from Swedish Patent Application No. 1930199-3, filed on Jun. 17, 2019, the disclosure of which is incorporated herein by reference.

TECHNICAL FIELD

The disclosure pertains to the field of controlling a status of a door.

BACKGROUND

I general a door can be either in an open state or in a closed state. In order to operate a door it can be of interest to know in what state the door is in. In order to determine if the door is in an open state or in a closed state, one solution is to use a switch that is e.g. mounted on a doorframe, which is actuated by the door itself and serves as a gauge for determining if the door is closed. Implicitly if the switch is not actuated one conclusion is that the door is open. When a door closing device, or a door opening device is used together with e.g. a swing door, mechanical gauges can be used to determine a movement of the door and thereby determine if a door is an open state or a closed state.

SUMMARY

There is a demand for an easier, more flexible and more reliable way to control if a door is in an open state or in a closed state. There is also a demand for understanding further states of the door that are between the open state and the closed state. Another desire is to understand the movement pattern of a door, to understand e.g. if a door is opened fast, closed hard, not braked, etc. in other words to understand speed, accelerations and deceleration of the door.

An object of the present disclosure is to provide system, method and computer program product for controlling the operation of a door which seek to mitigate, alleviate, or eliminate one or more of the above-identified deficiencies in the art and disadvantages singly or in any combination.

The disclosure proposes a door operation management system for controlling operation of a door. The door operation management system comprises at least a first movement sensor device arranged at the door, for determining a movement of the door and a processing circuitry operatively connected to the at least first movement sensor device. The processing circuitry is configured to cause the door operation management system to obtain at least a first sensor data from the at least first movement sensor device and determine at least a first state of the door based on the at least a first sensor data. An advantage with this solution is that by arranging the at least first movement sensor device on the door, which requires a minimum effort, the at least first movement sensor device can sense any movement of the door, e.g. an opening or closing of a door, which in turn results in least a first sensor data that can be used for determining at least a first state of the door.

According to an aspect the at least first sensor data is at least any of acceleration data, position data or velocity data. This gives a relative movement data that can be used for determining the at least a first state of the door.

According to an aspect the at least first state of the door is at least any of an open state, an opening state, a closed state and a closing state. In other words, this gives the advantage that a plurality of states relating to a relative movement of the door can be determined.

According to an aspect the at least first movement sensor device is at least any of a gyroscope or an accelerometer. According to an aspect the at least first sensor data is gyroscope data for determining a position of the door. This has the advantage that a relative movement and also a relative position of the door can be determined.

According to an aspect the door is a swing door and the position of the door corresponds to an angle between an open and a closed position of the swing door. This gives an indication of e.g. to what extent the door is open, but also an indication of e.g. when the door is about to go from an open state to a closed state, when the angle is decreasing.

According to an aspect the door operation management system further comprises a communication module configured to communicate via a communication network. The processing circuitry is operatively connected to the at least first movement sensor device and the communication module. The processing circuitry is further configured to cause the door operation management system to send, via the communication network, a door state information signal indicative of the at least first state of the door to at least a first remote door operation management system. According to an aspect the processing circuitry is further configured to cause the door operation management system to receive, via the communication network, a door state information signal indicative of the at least first state of at least a remote door in the at least first remote door operation management system.

In other words, the door operation management system can communicate the at least first state of the door to other door operation management systems, and receive at least first state of at least a remote door in the at least first remote door operation management system, in order to e.g. facilitate operation of a plurality of doors, e.g. in a building or the same room, connected to the other door operation management systems.

According to an aspect the processing circuitry is further configured to cause the door operation management system to send, via the communication network, a control signal, indicative of a close and/or open operation instruction, to at least a first door actuator device configured to close and/or open the door. The processing circuitry is further configured to cause the door operation management system to send, via the communication network, the control signal to the at least first remote door operation management system for closing and/or opening the at least remote door. This means that the door can be controlled to open or to close, but also that remote doors can also be controlled to open or to close.

According to an aspect the door operation management system is connectable to a battery power source and comprised in a case made of a material that is not blocking radio frequency waves, configured to be arranged on the door. This means that the the door operation management system can be easily attached on a door, with minimum installation and maintenance needed.

The disclosure further proposes a method for controlling operation of a door. The method comprising the step of obtaining at least a first sensor data from the at least first movement sensor device arranged at a door and the step of determining at least a first state of the door based on the at least a first sensor data. An advantage with this solution is that by arranging the at least first movement sensor device on the door, which requires a minimum effort, the at least first movement sensor device can sense any movement of the door, e.g. an opening or closing of a door, which in turn results in least a first sensor data that can be used for determining at least a first state of the door.

According to an aspect the method further comprising the step of sending, via a communication network, a door state information signal indicative of the at least first state of the door to at least a first remote door operation management system. According to an aspect the method further comprising the step of receiving, via the communication network, a door state information signal indicative of the at least first state of at least a remote door in the at least first remote door operation management system. In other words, the door operation management system can communicate the at least first state of the door to other door operation management systems, and receive at least first state of at least a remote door in the at least first remote door operation management system, in order to e.g. facilitate operation of a plurality of doors, e.g. in a building or the same room, connected to the other door operation management systems.

According to an aspect the method further comprising the step of sending, via the communication network, a control signal, indicative of a close and/or open operation instruction, to at least a first door actuator device configured to close and/or open the door and/or the step of sending, via the communication network, the control signal to the at least first remote door operation management system for closing and/or opening the at least remote door. This means that the door can be controlled to open or to close, but also that remote doors can also be controlled to open or to close.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
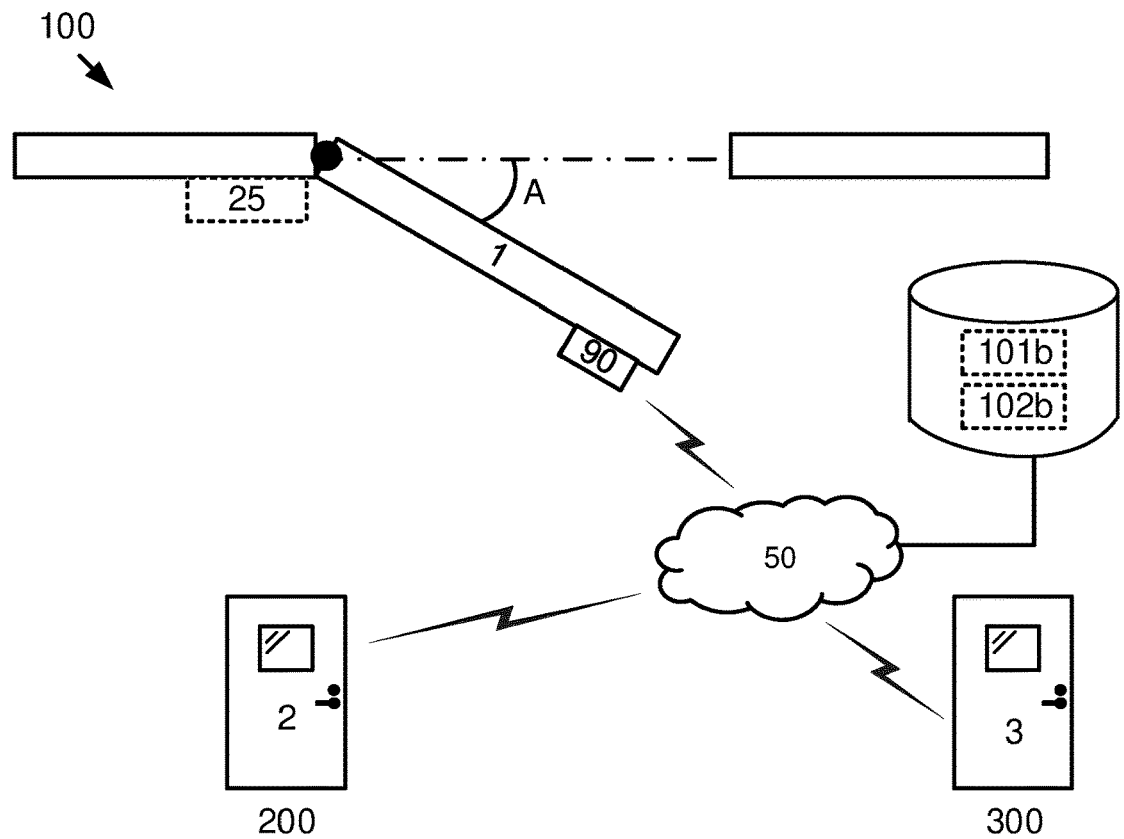
FIG. 1a illustrates the door operation management system connected to remote door operation management systems, via communication network, according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

There is a demand for an easier, more flexible and more reliable way to control if a door is in an open state or in a closed state. There is also a demand for understanding further states of the door that are between the open state and the closed state. Another desire is to understand the movement pattern of a door, to understand e.g. if a door is opened fast, closed hard, not braked, etc. in other words to understand speed, acceleration and deceleration of the door at a certain time.

An object of the present disclosure is to provide system, method and computer program product for controlling the operation of a door which seek to mitigate, alleviate, or eliminate one or more of the above-identified deficiencies in the art and disadvantages singly or in any combination.

Figure 1B:
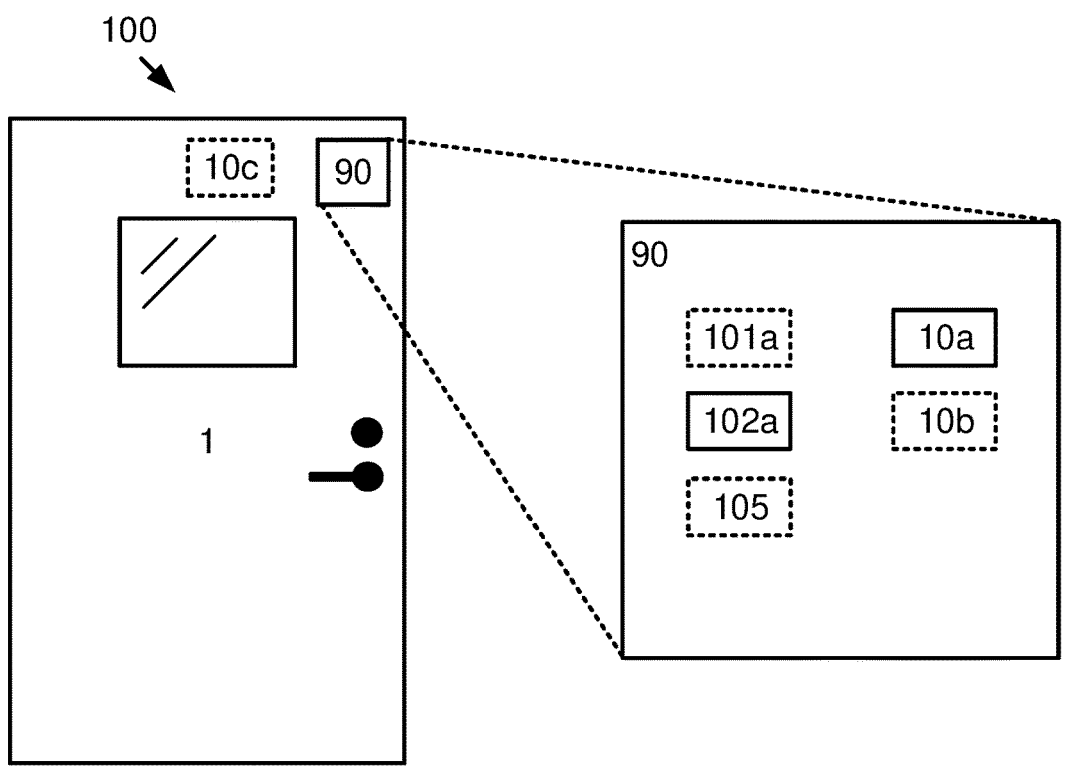
FIG. 1b illustrates the door operation management system according to an aspect of the disclosure.

As illustrated in FIG. 1a and FIG. 1b, the disclosure proposes a door operation management system 100 for controlling operation of a door 1. The illustration of the door 1 in FIG. 1a is as seen from above. The door 1 is arranged on e.g. a doorframe with hinges at the wall. The door operation management system 100 comprises at least a first movement sensor device 10a, 10b, 10c arranged at the door 1, for determining a movement of the door 1. The FIG. 1b illustrates example installation of the at least first movement sensor device 10a, 10b, 10c arranged at the door 1. In an example a first movement sensor device 10a is installed in a case 90 arranged at the door 1 as illustrated in FIG. 1b. Existing cases on doors, e.g. a case used for an infrared detector, can be used to receive the first movement sensor device 10a.

The door operation management system 100 comprises a processing circuitry 102a, 102b operatively connected to the at least first movement sensor device 10a, 10b, 10c. According to an aspect the processing circuitry 102a, 102b is operatively connected to the at least first movement sensor device 10a, 10b, 10c via a communication network 50. According to an aspect the processing circuitry 102a, 102b is a local processing circuitry 102a installed in the vicinity of the at least first movement sensor device 10a, 10b, 10c at the door 1. As illustrated in FIG. 1b, the processing circuitry 102a is installed in the case 90 together with the first movement sensor device 10a. According to an aspect the processing circuitry 102a, 102b is a remote processing circuitry 102b connected to at least first movement sensor device 10a, 10b, 10c via the communication network 50.

The communication network 50 is illustrated in FIG. 1a. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-Internet of Things, NB-IoT, Third Generation, 3G, Fourth Generation, 4G, Fifth Generation 5G, Worldwide Interoperability for Microwave Access, WiMAX or Ultra Mobile Broadband, UMB or similar network. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network.

The communication network 50 can also be a combination of both a local area network and a wide area network. The communication network 50 can also be wired networks. According to an aspect of the disclosure, the communication network 50 is defined by common Internet Protocols.

The processing circuitry 102a, 102b is configured to cause the door operation management system 100 to obtain at least a first sensor data dd1, dd2, dd3, dd4 from the at least first movement sensor device 10a, 10b, 10c and determine at least a first state st1, st2, st3, st4 of the door 1 based on the at least a first sensor data dd1, dd2, dd3, dd4. An advantage with this solution is that by arranging the at least first movement sensor device 10a, 10b, 10c on the door 1, which requires a minimum effort, the at least first movement sensor device 10a, 10b, 10c can sense any movement of the door 1, e.g. an opening or closing of a door, which in turn results in least a first sensor data dd1, dd2, dd3, dd4 that can be used for determining at least a first state st1, st2, st3, st4 of the door 1.

According to an aspect the at least first sensor data dd1, dd2, dd3, dd4 is at least any of acceleration data, position data or velocity data. This gives a relative movement data that can be used for determining the at least a first state st1, st2, st3, st4 of the door 1.

According to an aspect the at least first movement sensor device 10a, 10b, 10c is at least any of a gyroscope or an accelerometer. According to an aspect the at least first sensor data dd1, dd2, dd3, dd4 is gyroscope data for determining a position of the door 1. This has the advantage that a relative movement and also a relative position of the door 1 can be determined. In an example, when the door operation management system 100 in installed on the door 1, a calibration of the at least first movement sensor device 10a, 10b, 10c is needed in order to e.g. determine the relative position of the door 1.

According to an aspect one movement sensor device 10a, 10b, 10c can provide with a plurality of sensor data dd1, dd2, dd3, dd4 relating to movement.

According to an aspect the at least first state st1, st2, st3, st4 of the door 1 is at least any of an open state, an opening state, a closed state and a closing state. In other words, this gives the advantage that a plurality of states relating to a relative movement of the door 1 can be determined.

According to an aspect the door 1 is a swing door and the position of the door 1 corresponds to an angle A between an open and a closed position of the swing door. This gives an indication of e.g. to what extent the door 1 is open, but also an indication of e.g. when the door 1 is about to go from an open state to a closed state, when the angle A is decreasing.

Figure 2A:
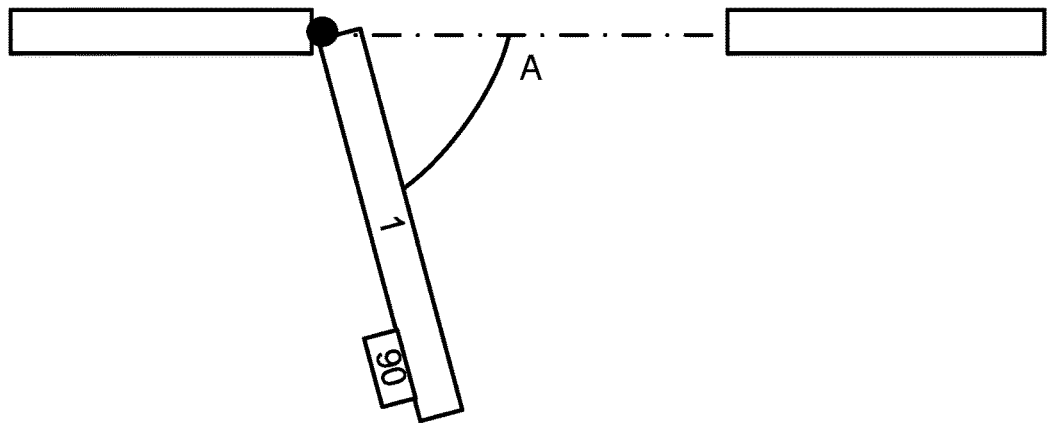
FIG. 2a illustrates an open state of the door according to an aspect of the disclosure.

In an example a first movement sensor device 10a provides with sensor data relating to gyroscope data. In the example the movement sensor device 10a provides with a relative position of the door 1. In the example an open state st1 is determined, it is also determined that the door is open with a certain angle A in relation to a closed state, as illustrated in FIG. 2a.

Figure 2B:
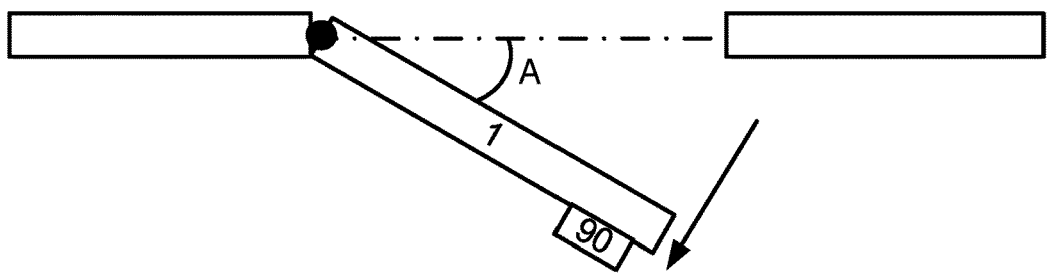
FIG. 2b illustrates an opening state of the door according to an aspect of the disclosure.

In an example a first movement sensor device 10a provides with sensor data relating to acceleration data. In the example the movement sensor device 10a provides with acceleration of the door 1, wherein the acceleration is determined to be in a direction that corresponds to an opening of a door. In the example an opening state st2 is determined, as illustrated in FIG. 2b.

Figure 2C:
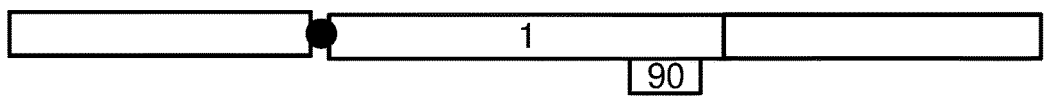
FIG. 2c illustrates a closed state of the door according to an aspect of the disclosure.

In an example a first movement sensor device 10a provides with sensor data relating to acceleration data, position data and velocity data. In the example the movement sensor device 10a provides with acceleration data of the door 1, wherein the acceleration is determined to be in a direction that corresponds to a closing of a door. The movement sensor device 10a further provides with a velocity data of the door. At a certain point the velocity data is zero, meaning that the door 1 has stopped. Before the door 1 stopped, a negative acceleration, or deceleration, was detected. In the example a door was pushed to be closed, and then stopped by a door brake, to prevent damage of the door, and then closed. The position data verifies that the door 1 is in a closed position. In the example a closed state st3 is determined as illustrated in FIG. 2c.

Figure 2D:
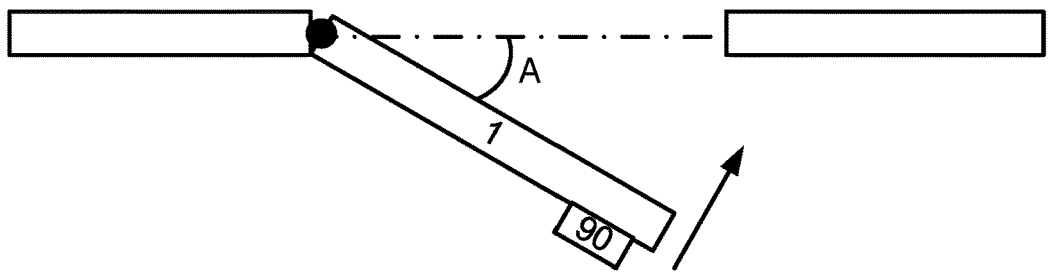
FIG. 2d illustrates a closing state of the door according to an aspect of the disclosure.
Figure 3:
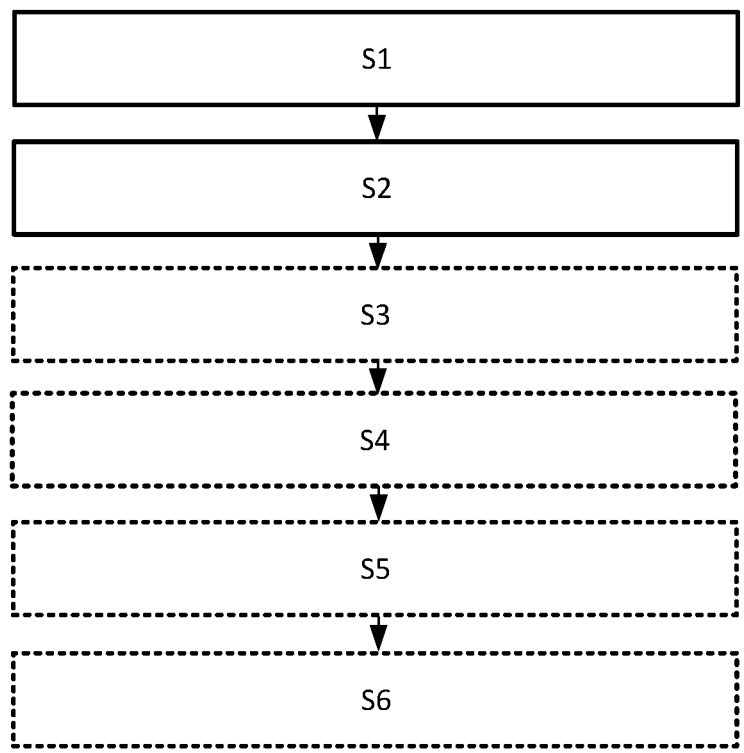
FIG. 3 illustrates a flow chart of the method steps according to some aspects of the disclosure.

In an example a first movement sensor device 10a provides with acceleration data and position data. In the example a first movement sensor device 10a provides with acceleration data indicating an acceleration in a direction that is indicating a closing of the door 1, and at the same time the first movement sensor device 10a provides with position data that is indicating that the door 1 is about to be closed within a short time frame. In the example a closing state st4 is determined as illustrated in FIG. 2d.

According to an aspect, the at least a first sensor data dd1, dd2, dd3, dd4 obtained from the at least first movement sensor device 10a, 10b, 10c, 10d, is stored together with a time stamp data in a memory 101a, 101b. This means among others that the data can be used for processing at a later point of time, and i.e. that a history of the movement pattern of the door 1 over time becomes available.

According to an aspect the memory 101a, 101b is a local memory 101a installed in the vicinity of the door 1. According to an aspect the memory 101a, 101b is a remote memory 101*b* connected to the processing circuitry 102*a*, 102*b* via the communication network 50.

The stored data can be used for e.g. planning of maintenance of the door 1. If e.g. a door is always accelerating and closing at a high speed without a brake, it can be determined that the door likely needs maintenance sooner than normal.

According to an aspect the door operation management system 100 further comprises a communication module 105 configured to communicate via a communication network 50. The processing circuitry 102*a*, 102*b* is operatively connected to the at least first movement sensor device 10*a*, 10*b*, 10*c* and the communication module 105. The processing circuitry 102*a*, 102*b* is further configured to cause the door operation management system 100 to send, via the communication network 50, a door state information signal indicative of the at least first state st1, st2, st3, st4 of the door 1 to at least a first remote door operation management system 200, 300. According to an aspect the processing circuitry 102*a*, 102*b* is further configured to cause the door operation management system 100 to receive, via the communication network 50, a door state information signal indicative of the at least first state st1, st2, st3, st4 of at least a remote door 2, 3 in the at least first remote door operation management system 200, 300. In an example the communication network 50 is a standardized wireless local area network such as a Wireless Local Area Network, WLAN, Bluetooth™, ZigBee, or similar network. According to an aspect the communication network is a so called mesh network comprising a number of nodes. In an example the door operation management system 100 and the remote door operation management system 200, 300 are linked together by a mesh network.

In other words, the door operation management system 100 can communicate the at least first state st1, st2, st3, st4 of the door 1 to other door operation management systems 200, 300, and receive at least first state st1, st2, st3, st4 of at least a remote door 2, 3 in the at least first remote door operation management system 200, 300, in order to e.g. facilitate operation of a plurality of doors, e.g. in a building or the same room, connected to the other door operation management systems 200, 300.

According to an aspect the processing circuitry 102*a*, 102*b* is further configured to cause the door operation management system 100 to send, via the communication network 50, a control signal, indicative of a close and/or open operation instruction, to at least a first door actuator device 25 configured to close and/or open the door 1. A door actuator device 25 is sometimes referred to as a door operator device. The processing circuitry 102*a*, 102*b* is further configured to cause the door operation management system 100 to send, via the communication network 50, the control signal to the at least first remote door operation management system 200, 300 for closing and/or opening the at least remote door 2, 3. In an example the remote door operation management systems 200, 300 also comprising door actuator devices configured to close and/or open the remote doors 2, 3 of the remote door operation management systems 200, 300. This means that the door 1 can be controlled to open or to close, but also that remote doors 2, 3 can also be controlled to open or to close.

According to an aspect the door operation management system 100 is connectable to a battery power source and comprised in a case 90 made of a material that is not blocking radio frequency waves, configured to be arranged on the door 1. This means that the door operation management system 100 can be easily attached on a door 1, with minimum installation and maintenance needed. In an example the battery power source is also comprised in the case 90, which makes the door operation management system 100 very easy to install. In an example the case 90 is attached in the door as illustrate din FIG. 1*b*.

The disclosure further proposes a method for controlling operation of a door 1. The method comprising the step of S1 obtaining at least a first sensor data dd1, dd2, dd3, dd4 from the at least first movement sensor device 10*a*, 10*b*, 10*c* arranged at a door 1 and the step of S2 determining at least a first state st1, st2, st3, st4 of the door 1 based on the at least a first sensor data dd1, dd2, dd3, dd4. An advantage with this solution is that by arranging the at least first movement sensor device 10*a*, 10*b*, 10*c* on the door 1, which requires a minimum effort, the at least first movement sensor device 10*a*, 10*b*, 10*c* can sense any movement of the door 1, e.g. an opening or closing of a door, which in turn results in least a first sensor data dd1, dd2, dd3, dd4 that can be used for determining at least a first state st1, st2, st3, st4 of the door 1.

According to an aspect the method further comprising the step of S3 sending, via a communication network 50, a door state information signal indicative of the at least first state st1, st2, st3, st4 of the door 1 to at least a first remote door operation management system 200, 300. According to an aspect the method further comprising the step of S4 receiving, via the communication network 50, a door state information signal indicative of the at least first state st1, st2, st3, st4 of at least a remote door 2, 3 in the at least first remote door operation management system 200, 300. In other words, the door operation management system 100 can communicate the at least first state st1, st2, st3, st4 of the door 1 to other door operation management systems 200, 300, and receive at least first state st1, st2, st3, st4 of at least a remote door 2, 3 in the at least first remote door operation management system 200, 300, in order to e.g. facilitate operation of a plurality of doors, e.g. in a building or the same room, connected to the other door operation management systems 200, 300.

According to an aspect the method further comprising the step of S5 sending, via the communication network 50, a control signal, indicative of a close and/or open operation instruction, to at least a first door actuator device 25 configured to close and/or open the door 1 and/or the step of S6 sending, via the communication network 50, the control signal to the at least first remote door operation management system 200, 300 for closing and/or opening the at least remote door 2, 3. This means that the door 1 can be controlled to open or to close, but also that remote doors 2, 3 can also be controlled to open or to close.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

Figure 4:
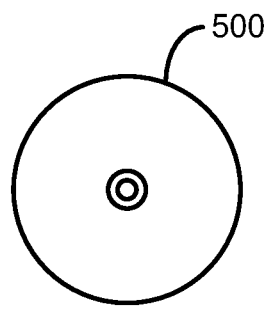
FIG. 4 illustrates a computer program product according to some aspects of the disclosure.

The disclosure further proposes, as illustrated in FIG. 4, a computer program product 500 comprising a non-transitory computer readable medium, having thereon a computer program comprising program instructions, the computer program being loadable into a processing circuitry 102*a*, 102*b* and configured to cause execution of the method when the computer program is run by the at least one processing circuitry 102*a*, 102*b*.

According to an aspect door operation management system 100 is configured to carry out any or more of the aspects of the described method. According to an aspect of the disclosure, the method is carried out by instructions in a software program that is downloaded and run in the vehicle window control system 100.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A door operation management system for controlling operation of a door, the door operation management system comprises:
    at least one first movement sensor device arranged at the door, for determining a movement of the door;
    a memory;
    a communication module configured to communicate via a communication network; and
    a processing circuitry operatively connected to the at least first movement sensor device the memory, and the communication device, wherein the processing circuitry is configured to cause the door operation management system to:
        obtain at least one first sensor data from the at least one first movement sensor device;
        determine at least one first state of the door based on the first sensor data;
    send, via the communication network, a door state information signal indicative of the at least one first state of the door to a remote door operation management system connected with a remote door;
    receive, via the communication network, a door state information signal indicative of at least one first state of the remote door;
    send, via the communication network, a control signal, indicative of a close and/or open operation instruction, to a door actuator device configured to close and/or open the door; and
    send, via the communication network, the control signal to the remote door operation management system for closing and/or opening the at least remote door,
    wherein the memory is configured to receive and store at least the first sensor data from the at least one first movement sensor device with a time stamp data of the movement of the door.

2. The door operation management system according to claim 1, wherein the at least one first sensor data is at least any of acceleration data, position data or velocity data.

3. The operation door management system according to claim 1, wherein the at least one first state of the door is at least any of an open state, or opening state, a closed state and a closing state.

4. The operation management system according to claim 1, wherein the at least one first movement sensor device is at least any of a gyroscope or an accelerometer.

5. The door operation management system according to claim 4, wherein the at least one first sensor data is gyroscope data for determining position of the door.

6. The door operation management system according to claim 5 wherein the door is a swing door and the position of the door corresponds to an angle between an open and a closed position of the swing door.

7. The door operation management system according to claim 1, the door operation management system is connectable to a battery power source and comprised in a case made of a material that is not block radio frequency waves, configured to be arranged on the door.

8. A method for controlling operation of a door with the doo operation management system of claim 1, the method comprising:
    obtaining the first sensor data from the at least first movement sensor device arranged at a door;
    receiving and storing in the memory the first sensor data from the at least one first movement sensor device with the time stamp data of the movement of the door; and
    determining at the least one first state of the door based on the first sensor data.

9. The method according to claim 8 further comprising:
    sending, via the communication network, the door state information signal indicative of the at least one first state of the door to at least the first remote door operation management system.

10. The method according to claim 8 further comprising:
    receiving, via the communication network, the door state information signal indicative of the at least one first state of the remote door from the remote door operation management system.

11. The method according to claim 8 further comprising:
    sending, via the communication network, the control signal, indicative of a close and/or open operation instruction, to the first door actuator device configured to close and/or open the door; and
    sending, via the communication network, the control signal to the at least first remote door operation management system for closing and/or opening the remote door.

12. A computer program product comprising a non-transitory computer readable medium, having thereon a computer program comprising program instructions, the computer program being loadable into the processing circuitry and configured to cause execution of the method according to claim 8 when the computer program is run by the at least one processing circuitry.

* * * * *